United States Patent [19]

Warwick et al.

[11] Patent Number: 4,553,650
[45] Date of Patent: Nov. 19, 1985

[54] DUAL FUNCTION BRAKE PEDAL PROVIDING SEPARATE CONTROLS FOR HYDRAULIC AND MECHANICAL BRAKES

[75] Inventors: Edward H. Warwick, Englewood; Donald L. Parker, Middletown, both of Ohio

[73] Assignee: General Motors Corporation, Detroit, Mich.

[21] Appl. No.: 472,711

[22] Filed: Mar. 7, 1983

[51] Int. Cl.[4] .................. B60K 41/28; G05G 5/24; G05G 13/02
[52] U.S. Cl. .................. 192/4 A; 74/478.5; 74/540; 188/106 F; 192/1
[58] Field of Search ............... 192/4 A, 1, 2; 188/106 F; 180/272; 74/478.5, 540

[56] References Cited

U.S. PATENT DOCUMENTS

| 1,753,370 | 4/1930 | Du Pont | 188/106 F X |
| 3,003,605 | 10/1961 | Apple | 192/4 A |
| 3,299,999 | 1/1967 | Martin | 192/4 A |
| 4,281,736 | 8/1981 | Lizzio | 192/4 A X |
| 4,454,936 | 6/1984 | Wise | 192/4 A |
| 4,462,487 | 7/1984 | Warwick et al. | 192/4 A |

Primary Examiner—Rodney H. Bonck
Attorney, Agent, or Firm—D. D. McGraw

[57] ABSTRACT

A service brake pedal is overlapped by a parking brake pedal with both pedal arms mounted on a common axis for pivotal apply and release movements. The service brake pedal arm contacts a pin holding the push rod for the master cylinder, applying the hydraulic service brakes when the pedal is depressed. When the transmission lever is shifted into the park position a solenoid type servo is energized, engaging a pawl, mounted on the parking brake pedal arm, with a gear sector pivoted about the pivot point of the brake pedal arms. A one-way spring clutch is energized to hold the link in which the push rod pin is installed in the applied position during parking brake apply, retaining hydraulic brake pressure during that operation. When shifting to park, the parking brake pedal arm is raised by a vacuum servo so that the parking brake pedal can be actuated to apply the parking brake without contacting the service brake pedal, and therefore without hydraulic pressure resistance. Movement of the parking brake pedal with the pawl engaged exerts tension on the parking brake cable through the gear sector to apply the parking brake. When the ignition key is turned off, the spring clutch is released and the hydraulic service brakes are released. The pawl is retracted when the ignition key is turned off, and another spring clutch prevents release of the parking brake. This clutch is released upon shifting the transmission lever from park. A circuit is provided which prevents reengagement of the pawl until the transmission lever is shifted out of and then back into park.

5 Claims, 5 Drawing Figures

DUAL FUNCTION BRAKE PEDAL PROVIDING SEPARATE CONTROLS FOR HYDRAULIC AND MECHANICAL BRAKES

The invention relates to a control mechanism for controlling both the service brakes and the parking brakes of an automotive vehicle. In the preferred embodiment illustrated a single control mechanism, in the form of a combined service brake pedal and a parking brake pedal, is actuated by the foot of the vehicle operator or driver in an arcuately moving direction to actuate the service brakes under normal vehicle operating conditions, and is actuated in the same manner to actuate the vehicle parking brakes under conditions when it is appropriate to set the vehicle parking brakes. Brake pedal arm assemblies are pivoted for arcuate movement on a support mechanism which is a fixed part of the vehicle in which the system is installed. The pedal of the service brake pedal arm is overlapped by the pedal of the parking brake pedal arm so that both pedal arms are moved during normal service brake operation by the vehicle operator's foot acting on the parking brake pedal. When the parking brake is to be applied, the parking brake pedal arm and pedal are lifted to provide greater pedal stroke. This action also lifts the parking brake pedal away from the service brake pedal. Arcuately movable service brake and parking brake operating links are also pivoted on the same pivot. Suitable controls for controlling actuation of the service brake mechanism and the parking brake mechanism are provided.

The control mechanism herein disclosed and claimed is closely related to the control mechanism disclosed and claimed in co-pending U.S. patent application Ser. No. 372,940, filed Apr. 29, 1982, now U.S. Pat. No. 4.462,487, issued Jul. 31, 1984, entitled "Combined Vehicle Service and Parking Brake Control Mechanism", and assigned to the common assignee. That patent is also concerned with a single control mechanism for the vehicle service and parking brakes. The particular embodiment therein disclosed uses a single brake pedal arm. The improvement herein disclosed and claimed retains the advantages of the earlier structure as set forth herein, while providing structurally independent parking and service brake actuating controls as required by some countries.

In normal operation of the service brakes, the parking brake pedal is depressed by the vehicle operator to move both pedal arms. The service brake pedal arm operates the master cylinder through suitable linkage, generating brake actuating pressure which is delivered to the vehicle service brakes so that the vehicle slows and/or stops. Normally the parking brake is to be energized after the vehicle is stopped. In order to actuate the vehicle parking brake system, the vehicle is stopped and the transmission is shifted into a park position. This conditions the control mechanism for actuation of the parking brakes. In the preferred embodiment, the pedal arm which is to actuate the parking brake is raised to provide additional pedal arm stroke for the mechanical operation of the parking brake system. If the vehicle operator holds the service brakes in the applied position at the time the transmission is shifted into park, the mechanism will retain the master cylinder in the actuated position even though the parking brake pedal arm is then raised while the operator eases the force exerted thereon through his foot. The parking brake applying movement of the parking brake pedal moves the raised parking brake pedal arm from the raised position and actuates the parking brake linkage without hydraulic brake system resistance. The parking brake pedal may be released so that it returns to the raised position, and then re-applied to further actuate the parking brakes, if necessary.

The mechanism is arranged so that when the vehicle operator then turns the ignition key to the off position, the service brakes are released while the parking brakes remain applied. The service and parking brake pedals are returned to the base condition position, which is the released position without the parking brake pedal arm being raised. The parking brake mechanism is held in the applied position by mechanical means requiring no continuous supply of energy.

When at some later time the vehicle operator decides to use the vehicle, he will commonly restart the engine while the transmission is still in park. Under this condition, the parking brake will remain applied. If the vehicle operator should shift the transmission out of park and into the neutral position before restarting the engine, the parking brake mechanism would be released and no brakes would be applied so long as the operator did not move the brake pedals in the actuating direction. If he then starts the engine, a reset circuit will be actuated so as to condition appropriate portions of the control mechanism so that, although all system components are in the base release condition, the control mechanism would be conditioned to be reenergized for again raising the parking brake pedal arm when the transmission is shifted into park, the mechanism then being ready to again have the parking brake system applied. However, no brakes will be applied at this time unless the vehicle operator operates the control mechanism in a service brake operating manner as described above.

The mechanism includes switches which control the vehicle stop lights and a cruise control system so that they are actuated only for service brake application, and remain actuated only while the service brakes are pressurized. Thus the stop lights of the vehicle will be energized and the cruise control system will be deenergized only during service brake application and pressurization.

The system has the advantage of requiring no separately located parking brake operating mechanism such as a hand brake lever or a completely separate foot operated parking brake lever. Thus the control mechanism will permit better use of the volume of the passenger portion of the vehicle body and will provide safe operation of the vehicle for both service brakes and parking brake operation. This provides savings in weight and cost, eliminates door opening intrusion when certain types of parking brake levers are used, provides an opportunity for styling innovations by eliminating the separately located parking brake lever, and its release handle provides an easy brake apply and release mechanism with a usable emergency brake, and provides automatic release of the parking brake when the transmission is shifted out of the park position. The control mechanism is adapted for operation as a hillholder for manual shift vehicles. It provides for a desirable increase in mechanical advantage for both force and travel of the parking brake cable.

IN THE DRAWINGS:

FIG. 1 is a schematic representation of the control mechanism embodying the invention, with the mechanism in the base condition of operation. All vehicle brakes are released and the vehicle is traveling under power, or at least has the vehicle transmission in a transmission control position other than the park position. This is the normal brake release condition.

The system schematically illustrated in FIG. 1 will be described in detail, and the description of the various elements of the mechanism will also apply to FIGS. 2, 3 and 3a.

Figure 4:
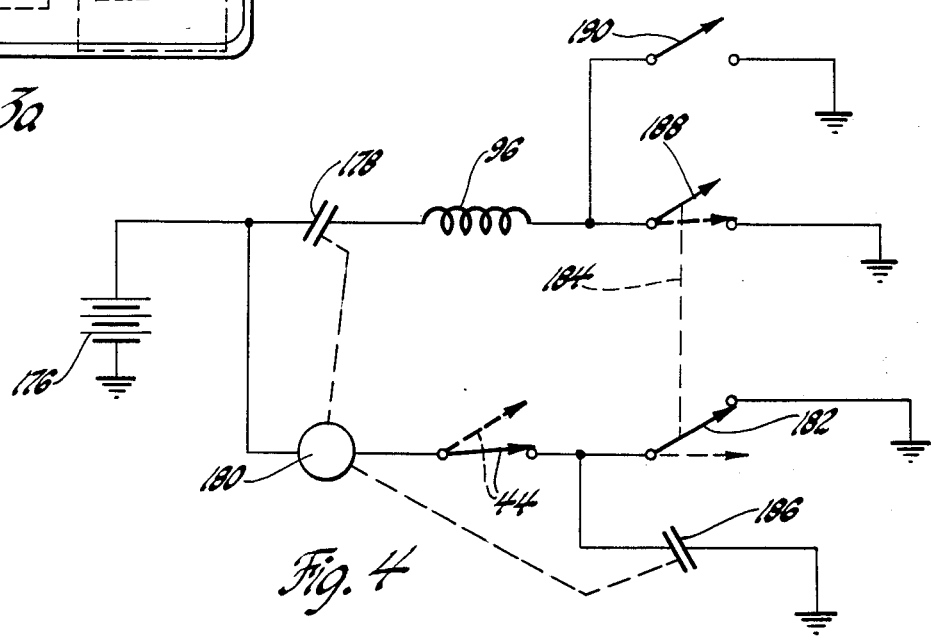
FIG. 4 is an electrical circuit diagram showing the electrical control portions of the control mechanisms.

The vehicle 10 in which the control mechanism 12 embodying the invention is installed has a master cylinder 14 fluid connected to selectively pressurize brake fluid in circuits 16 and 18 and operate service brake 20, 22, 24 and 26. The vehicle front service brakes 20 and 22 are illustrated as being connected in brake circuit 16 for actuation. The vehicle rear service brakes 24 and 26 are illustrated as being connected in brake circuit 18 for actuation. The rear brakes also include parking brakes 28 and 30, which are schematically illustrated as being included in the rear service brake structure in a manner commonly known in the art. As found on some vehicles, the parking brakes may be included in the front brake structure, or may be an entirely separate brake structure. The parking brakes 28 and 30 are schematically illustrated as being actuated by tension applied to a parking brake cable 32 connected to a suitable equalizer 34, which in turn is moved as tension is placed on a parking brake actuator shown as a cable 36. Cable 36 is connected to equalizer 34 at one end, passes through a suitable cable guide 38 mounted at 40 on a suitable fixed portion of the vehicle, and is connected to the control mechanism 12 as will be further described. The vehicle 10 has a vehicle engine 41 for driving the vehicle, as is well known in the art. If the engine is of the typical gasoline powered internal combustion type, the engine intake manifold may be the vacuum source 42 which provides vacuum for the control mechanism 12 as will be described. With some types of vehicle engine power, a separate vacuum source driven by the engine may be required. The vacuum source 42 provides vacuum only while the vehicle engine is running. The vehicle engine is controlled by a suitable ignition switch forming a part of the electrical circuitry of FIG. 4 and identified therein by reference character 44. The ignition switch is usually controlled by a key, as is well known in the art. It may also control other devices in the vehicle, or at least control electrical power to such other devices. In FIG. 4 it is illustrated only to the extent that it controls devices which are directly applicable to the control mechanism 12 embodying the invention. It is to be understood that it controls the running and stopping of the vehicle engine as well.

The control mechanism 12 more particularly has a pedal arm assembly with a parking brake pedal 46p mounted on a parking brake pedal arm 48p, and a service brake pedal 46s mounted on a service brake pedal arm 48s. A mount 50, secured to a suitable fixed portion of vehicle 10, has a pivot 52 thereon which may be in the form of a pivot pin. A center portion of the parking brake pedal arm 48p is mounted on the pivot pin 52 so as to be pivotally movable about the axis 54 defined by the pivot pin. One end of service brake pedal arm 48s is mounted on the pivot pin 52 so as to be pivotally movable about axis 54. The parking brake pedal arm 48p extends beyond the pivot axis 54, with its end 56 opposite the end on which pedal 46p is mounted extending generally at an angle relative to the portion of the parking brake pedal arm on which the pedal 46p is received. A pair of links 58 and 60 are also mounted on pivot pin 52 so as to pivot about axis 54. Links 58 and 60 are schematically illustrated as being shaped like pie sections or sectors, with the apexes of the pie sections having the pivot pin 52 extending therethrough and the arcuate edges formed to provide gear sectors 62 and 64, respectively. Link 58 has a pivot pin 66 illustrated as being positioned near one edge of the link and having connected thereto in pivotal relation a fitting 68 to which the cable end 70 of the parking brake cable 36 is attached. As illustrated in the schematic Figures, clockwise movement of link 58 about axis 54 will tension cable 36 and counterclockwise movement of link 58 will release the tension in cable 36.

The gear sector 64 formed on link 60 is schematically illustrated as extending along a substantial part of the arcuate portion of the link but terminating short of one corner 72. A pin 74 is fixed to link 60 at corner 72 and is positioned to pass through the plane of movement of the service brake pedal arm 48s so that an edge portion 76 of that pedal arm is abuttably engageable with the side of the pin 74. Pin 74 is also schematically illustrated as providing the pivot point of attachment of one end of the push rod 78 which is connected to operate the master cylinder 14. The push rod may operate the master cylinder through a power brake booster mechanism 80, if desired. It can be seen that when link 60 and pin 74 are moved in a clockwise direction about axis 54 by brake actuating movement of service brake pedal arm 48s, the pedal arm edge portion 76 engaging pin 74, the force is transmitted to the push rod 78 for actuation of the master cylinder 14. It is to be understood that the service brake pedal arm 48s can be moved counterclockwise relative to the pin 74 under some circumstances so that the pedal arm edge portion 76 does not engage the pin 74.

The parking brake pedal arm end 56 has a pawl link 82 pivotally attached thereto by pivot pin 84 so that the pawl link is positioned in the plane of link 58. One arm 86 of the pawl link 82 is formed to provide a pawl tooth 88 which is positioned to be selectively engageable with and disengageable from gear teeth of gear sector 62. It is also arranged that the pawl tooth will ratchet over teeth of gear sector 62 when the pedal arm end 56 is moved counterclockwise relative to the link 58. The tooth 88 will latch into the space between two gear teeth of gear sector 62 so that if, while the tooth 88 is so engaged, the pedal arm end 56 is moved in a clockwise direction about axis 54, it will also move link 58 in a clockwise direction. A torsion pawl retracting spring 90 is illustrated as being wrapped about pivot pin 84 and having one end engaging the link arm 86 and the other end engaging the pedal arm end 56 so as to continually urge the pawl link in a counterclockwise direction of rotation about pivot pin 84, therefore continually urging the pawl tooth 88 out of engagement with teeth of gear sector 62. The opposite arm 92 of pawl link 82 has a solenoid actuated link 94 connected thereto. The solenoid 96 when energized moves link 94 axially, and is mounted on the pedal arm end 56 so that energization of the solenoid overcomes the force of the spring 90 and moves the pawl tooth 88 into engagement with teeth of gear sector 62.

A toothed gear 98, forming a part of a oneway spring clutch 100, has its teeth engaged with the teeth of gear sector 62. Gear 98 is pivotally mounted on a fixed mount, not shown but connected with mount 50. Gear 98 is free to rotate about its axis 102, subject to the action of the clutch spring 104. This spring has one or more turns wound about a smaller diameter portion of the gear 98 so as not to interfere with the meshing action of the gear teeth with the teeth of the gear sector, and is normally so tightly wound that it acts as a normally engaged one-way clutch. One spring arm 106 is secured to a suitable mount 108 to prevent movement of that spring arm. The other spring arm 110 is connected to the shaft 112 of a servo 114. Servo 114 is suitably mounted at 116 to a housing portion of the assembly of which mounts 50 and 108 are considered to be a part. Servo 114 is illustrated as being a vacuum operated servo, and has a vacuum conduit 118 operatively connected to the vacuum source 42 through a valve arrangement controlled by the transmission shift control mechanism. The servo is so arranged that when atmospheric pressure is in the conduit 118 the spring clutch 100 is engaged. When vacuum from the vacuum source 42 is exerted in the servo, the servo moves shaft 112 rightwardly as seen in FIG. 1 to pivot spring arm 110 sufficiently to disengage the turns of spring 104 from the gear 98 so that the gear may be freely rotated. When the vacuum in conduit 118 no longer exists, and the conduit returns to atmospheric pressure, the servo 114 will permit the spring tension in spring arm 110 to move the shaft 112 leftwardly so that the spring clutch is again engaged and prevents rotation or movement of the gear 98 in the clockwise direction. It will continue to permit the rotation of gear 98 in the counterclockwise direction due to the one-way clutch action of the spring turns. The clutch 100 and servo motor 114, with the interconnecting structure, selectively permits and prevents brake releasing pivotal movement of sector or link 58.

Another one-way spring clutch 120 controls another gear 122 similar to gear 98. The teeth of gear 122 are in meshing engagement with the teeth of gear sector 64. Clutch 120 is normally disengaged. Although the turns of the clutch spring 124 about a portion of gear 122 are formed sufficiently tightly to engage that gear in a one-way clutch action, the movable spring arm 126 is urged away from the fixed spring arm 128 by a clutch release spring 130 schematically illustrated as acting on the movable spring arm 126 and reacting on the fixed mount 132 holding the fixed spring arm 128 in position. Mount 132 is connected to a suitable housing portion of the assembly to which the other mounts 50, 108 and 116 are also secured. Clutch release spring 130 continually urges the spring arm 126 away from spring arm 128 to obtain the normally disengaged condition of the clutch 120. A shaft 134 is connected to the end of spring arm 126 and is the output member of the servo 136. This servo is secured to a mount 138, which may also be mounted on a suitable housing portion as are the other mounts. Servo 136 is also illustrated as being a vacuum pressure operated servo, and has a vacuum conduit 140 operatively connecting the servo to vacuum source 42 through the valve arrangement controlled by the transmission shift control mechanism. The servo is energized to move shaft 134 to tighten the turns of spring 124 on gear 122 to establish the one-way clutch action which permits counterclockwise rotation of gear 122 while preventing clockwise rotation of that gear. The valve 142 is positioned between the vacuum source 42 and the conduits 118 and 140. Valve 142 is controlled by movement of the transmission control mechanism by the vehicle driver or operation so that conduit 140 is connected to the vacuum source 42 only while the transmission is in the park position, and conduit 118 is connected to vacuum source 42 when the transmission control is in any position other than park. The dashed lines labeled P, R, N, D, L show the position of valve 142 in various vehicle control conditions relating to transmission operation.

A pedal arm raising servo 144 is secured to a mount 146 which is also connected to a suitable housing as are the other mounts earlier described. Servo 144 has a cylinder 148 in which a piston 150 is reciprocably received to define with the cylinder a variable pressure chamber 152. Chamber 152 is operatively connected by the vacuum conduit 154 to the vacuum source 42 through a part of conduit 140 and vacuum control valve 142. Piston 150 has its outer end 156 connected to one end 158 of a link 160. The other end 162 of the link is connected to a portion of the parking brake pedal arm 48p intermediate the pivot pin 52 and the pedal 46p. It is illustrated as being connected more closely to the pivot pin 52. A compression spring 164 is positioned in chamber 152 so that one end engages piston 150 and the other end engages the chamber end 166 through which the vacuum conduit 154 is connected. Spring 164 continually urges piston 150 outwardly of cylinder 148 so that it urges the parking brake pedal arm 48p in a clockwise pivoting direction about the axis 54 of pivot pin 52. As will be further discussed below, the introduction of vacuum in chamber 152 will urge piston 150 against the force of spring 164 so that the servo urges the parking brake pedal arm 48p toward a raised position higher than the position normally maintained in the base condition. Thus servo 144 when so actuated conditions the parking brake pedal 46p to be stroked from a raised position, without contacting the service brake pedal 46s, to actuate the parking brake portion of the system without hydraulic pressure resistance of the service brake system. The raised position also provides additional pedal travel for the mechanical actuation of the parking brake system.

Switches 168 and 170 are schematically illustrated as being mounted on a mount 172 so that their plungers are engageable with the edge 174 of link 60. When the service brake mechanism is in the released position illustrated in FIG. 1, the link edge 174 engages the switch plungers so that the stop light switch 168 is not energized, and the cruise control switch 170 is closed so that the cruise control may be used when desired. It can be seen that when link 60 pivots clockwise about axis 54, the switch plungers will be permitted to move to reverse the conditions of the two switches 168 and 170. Since link 60 moves clockwise about axis 54 only during service brake application, the stop light and cruise control switches 168 and 170 will be so actuated as to energize the vehicle stop lights and deenergize the vehicle cruise control only during service brake operation.

FIG. 4 shows a circuit which is used to control the solenoid 96 to prevent the tension force in the parking brake cable 36 from feeding back into the parking brake pedal arm 48p and pedal 46p when the vehicle has been placed in park, the parking brake applied, and the ignition turned off. It also shows provision for an emergency brake switch that will activate solenoid 96 even when the transmission is out of park. This arrangement allows the vehicle operator or driver to have mechanical brakes in the event that the hydraulic service brake system is totally inoperable. The circuit of FIG. 4 includes a suitable source of electrical power such as the battery 176. Solenoid 96 is connected to one side of battery 176 through a relay operated switch 178. The relay 180 which operates switch 178 is connected to battery 176 and through the ignition switch 44 and a switch 182 to ground. Switch 182 is closed so long as the transmission control mechanism, schematically illustrated at 184, is out of park position. Another relay operated switch 186, also controlled by relay 180, connects the relay 180 through the ignition switch 44 to ground once the relay 180 has been energized while switch 182 is closed. Even though switch 178 is closed with energization of relay 180, solenoid 96 will not be energized since it must be connected through ground either to the switch 188, also closed by shifting the transmission control mechanism into park, or through the manually operable emergency switch 190. Switch 190 is normally open, and may be closed manually by the vehicle operator when use of the mechanical brake system of the parking brake arrangement is required in order to apply brakes even though the transmission control mechanism is not in the park position. It is to be understood that the transmission control mechanism 184 may mechanically control the valve 142 to disconnect conduit 118 from vacuum source 42 and to connect conduit 140 to vacuum source 42 when the transmission is shifted into the park position, and to reverse these connections when the transmission is shifted out of the park position.

Figure 1:
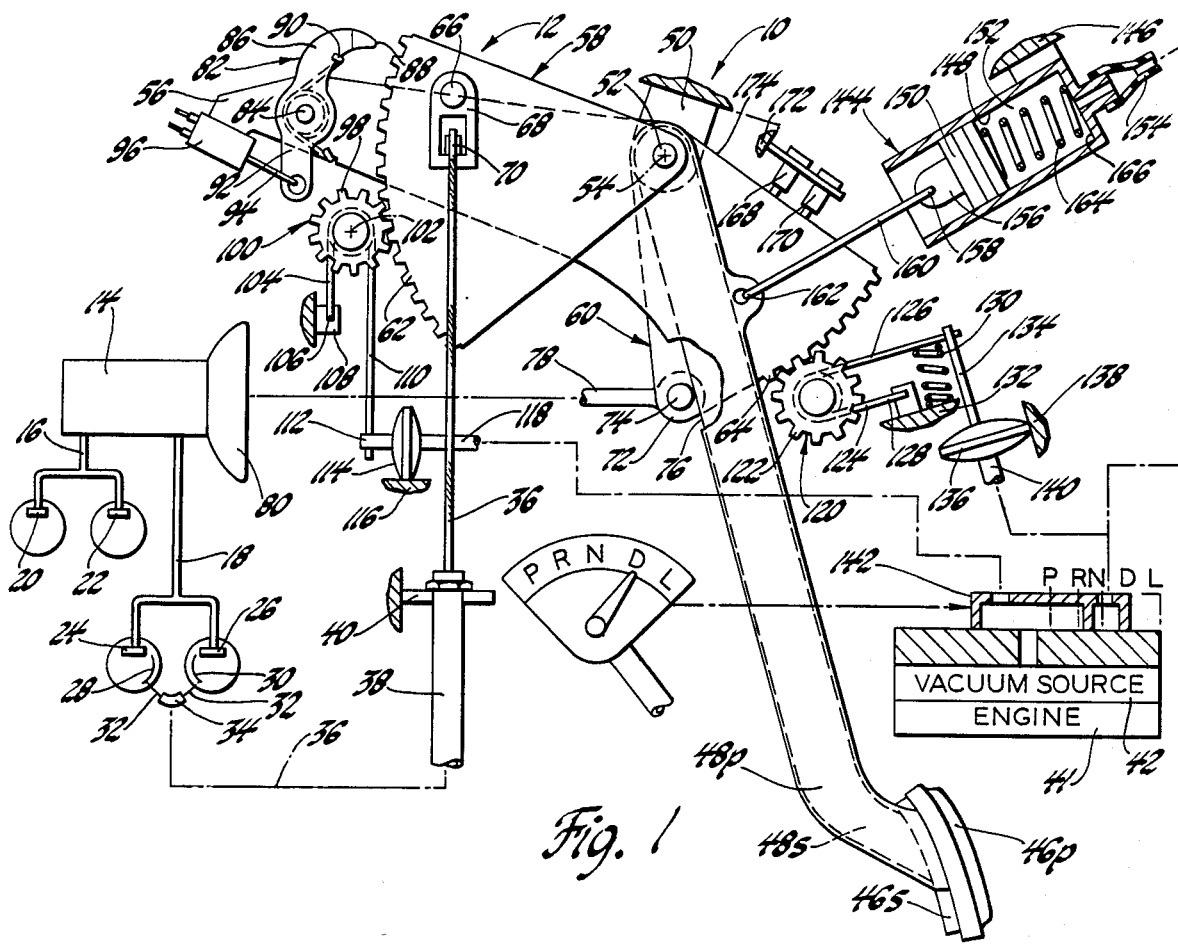

FIG. 1 shows the system in the base condition of operation. The base condition is established for descriptive purposes as being that condition in which the vehicle is traveling under power from its engine and no brakes are applied. The service brake pedal arm 48s is resting against pin 74. The one-way spring clutch 100 is disengaged. The one-way spring clutch 120 is disengaged. Solenoid 96 is deenergized. Pawl tooth 88 is disengaged from gear sector 62. Since the vehicle engine is operating, there is vacuum in the vacuum source 42. Vacuum is present in servo 114 because the open portion of valve 142 connects conduit 118 to vacuum source 42. Clutch 100 is therefore disengaged. Both the service brake system and the parking brake system are released. The closed portion of valve 142, closed because the transmission control mechanism is not in the park position, prevents vacuum from reaching servos 136 and 144. They are therefore at atmospheric pressure.

Figure 2:
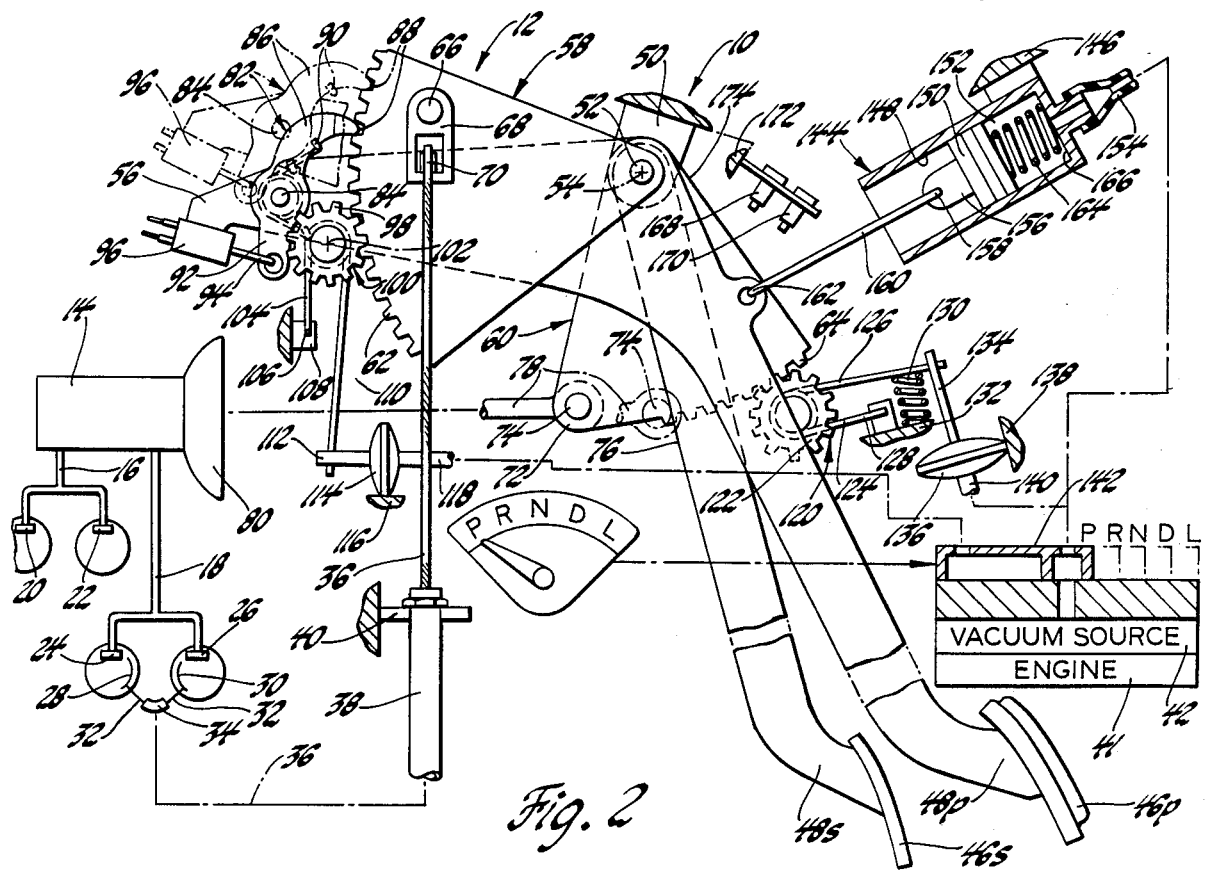
FIG. 2 is an illustration similar to that of FIG. 1, but showing the control mechanism after the service brakes have been applied to bring the vehicle to a stop and the transmission is shifted to the park position. The vehicle engine may be considered to be still running at this point.
Figure 3:
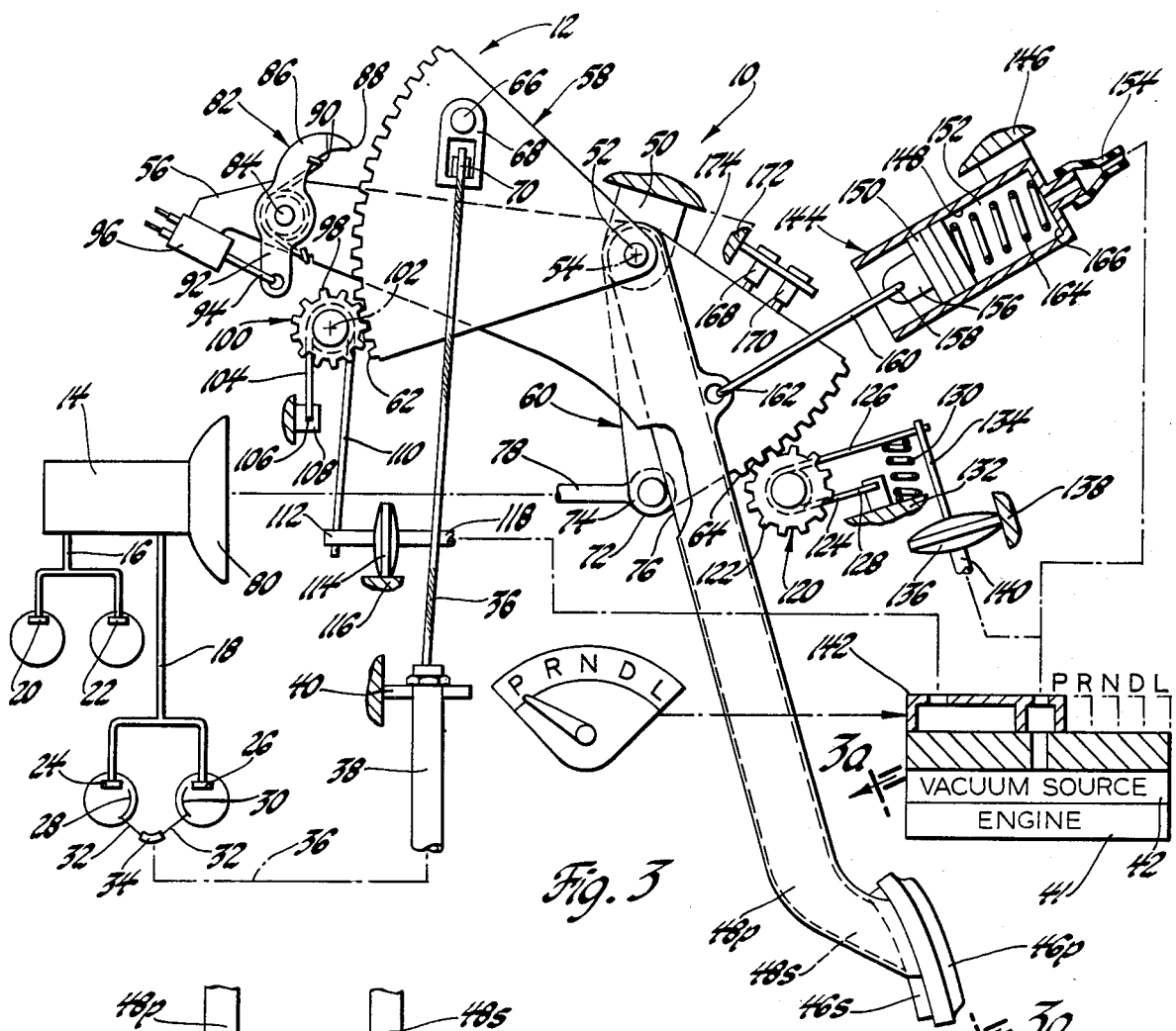
FIG. 3 is similar to FIG. 2 but showing the control mechanism after the engine ignition key has been turned off, the transmission being in park and the vehicle stopped. The parking brake has been energized before the engine ignition key has been turned off.
Figure 3A:
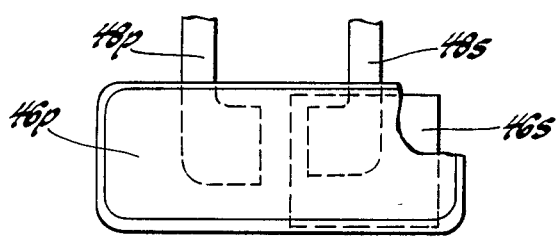
FIG. 3a is a fragmentary elevation view, taken in the direction of arrows 3a—3a, and shows the overlapping relationship of the brake pedals.

FIG. 2 shows the control mechanism when the service brakes are actuated with the transmission in a position other than park (e.g., in drive), the engine is running and the vehicle then stops, after which the transmission control mechanism is shifted to park while the vehicle remains stopped and the engine remains running. Therefore the ignition switch 44 remains closed at this time. When the vehicle operator exerts force on the parking brake pedal 46p, and through it to service brake pedal 46s to actuate the service brakes, the brake pedal arms 48p and 48s are moved clockwise about axis 54 as seen in FIGS. 1 and 2. Since the service pedal arm 48s is already in engagement with pin 74, this movement is transmitted directly through pin 74 and push rod 78 to actuate the master cylinder 14. Brake fluid pressure is therefore pressurized in brake circuits 16 and 18 and the service brakes 20, 22 and 24, 26, are actuated to bring the vehicle to a stop. This portion of the action is indicated by the phantom lines of the pin 74 and the end of push rod 78 which is attached to the pin. The pin 74 and the push rod 78 are moved to the position shown in solid lines in FIG. 2.

Having stopped the vehicle, the vehicle operator shifts the transmission control mechanism 184 to the park position while holding the brake pedals down so that the service brakes continue to be applied under pressure. Since relay 180 is energized through the closed ignition switch 44 and the closed switch 182, switches 178 and 186 are closed. The shifting of the transmission control mechanism 184 to park opens switch 182 and closes switch 188. Relay 180 remains energized through the relay control switch 186 so that switch 178 remains closed. The closure of switch 188 energizes solenoid 96. The energization of solenoid 96 causes link 94 to move the pawl link 82 clockwise about its pivot pin 84 to engage pawl tooth 88 with teeth of the gear sector 62. To this point, the gear sector 62 has not moved from the position shown in FIG. 1. The engagement of the pawl tooth with the gear sector sets up a ratchet effect which permits the pawl tooth 88 to ratchet on the gear sector 62 as the parking pedal arm 48p is raised as described below. The shifting of the transmission control mechanism 184 to park also moves valve 142 to energize servos 136 and 144 by vacuum from vacuum source 42. The energization of servo 136 causes the spring clutch 120 to become engaged, holding the link 60 in the applied position. Link 60 cannot move counterclockwise because the clockwise movement of gear 122 is prevented by the clutch 120. This retains the master cylinder 14 in the actuated position, and therefore retains the hydraulically operated service brake circuits 16 and 18 in the brake apply condition. The application of vacuum to chamber 152 of servo motor 144 causes piston 150 to move against the force of spring 164 and exerts a tension force through link 160 to raise the parking pedal arm 48p to the position shown in FIG. 2. If the operator still has his foot on pedal 46p, he will feel the pedal raising force and can remove his foot from the pedal. The pawl tooth 88 ratchets on the gear sector 62 from the position shown in phantom lines in FIG. 2 to the position shown in solid lines in that Figure. At this point the parking brake pedal arm 48p is conditioned to be stroked from the raised position without causing service brake pedal arm 48s to contact the pin 74. This stroking action will apply the parking brake mechanism without any hydraulic resistance from the master cylinder 14 through push rod 78 and pin 74. Since link 60 has been moved clockwise as the service brakes are applied, the plungers of switches 168 and 170 have been released so that switch 168 closes and the vehicle brake stop lights are energized. Switch 170 opens so that the cruise control mechanism is deenergized.

The vehicle operator then applies the parking brake mechanism by actuating the parking brake pedal arm 48p from its raised position illustrated in FIG. 2. This can usually be accomplished to the desired extent by one pedal stroke. However, if more tension on cable 36 is required, the operator can let pedal arm 48p be raised again, and again stroke the pedal 46p to further move link 58 clockwise and add more tension to cable 36.

The actuation of parking brake pedal arm 48p to apply the vehicle parking brakes from the raised position gives additional parking brake pedal stroke as compared to actuation from the position shown in FIG. 1 from which the service brakes are actuated as above described. The movement of parking brake pedal arm 48p in the clockwise direction to the position shown in FIG. 3 transmits a force through the pawl link 82 to the link 58 to move link 58 in a clockwise direction as seen in FIGS. 2 and 3. The one-way spring clutch 100 will allow this action since that clutch, although engaged, permits the gear 98 to rotate in the counterclockwise direction. Since the clutch 100 will prevent clockwise rotation of gear 98, the gear and the clutch will prevent counterclockwise return movement of gear sector 62 so long as the clutch 100 is engaged. The clockwise movement of link 58 exerts a tension force on the parking brake cable 36 through pivot pin 66 and the fitting 68. This tension force is transmitted through the cable equalizer 34 to the cable 32 to actuate the parking brakes 28 and 30. This action occurs while the hydraulically actuated service brakes are still applied because of the holding action of clutch 120 before the ignition key is turned off. Therefore, the only force that the vehicle operator has to overcome in order to apply the parking brakes is the force resisting application of the parking brakes themselves. He does not have to overcome any of the hydraulic resistance exerted by the master cylinder.

When the vehicle operator turns the ignition key to the off position, the ignition switch 44 is opened, deenergizing relay 180 and therefore opening switches 178 and 186. This deenergizes solenoid 96, and the pawl retracting spring 90 rotates the pawl link 82 counterclockwise, lifting pawl tooth 88 out of engagement with the gear teeth of gear sector 62. Atmospheric air pressure is admitted to servos 136 and 144 since vacuum is no longer available in vacuum source 42. Since servo 136 no longer applies force to the spring arm 126 to overcome the clutch release spring 130, spring 130 expands, moving the spring arm 126 so that the one-way clutch 120 is disengaged. This allows relatively free rotation of gear 122 in either direction. Therefore, the gear and clutch no longer prevent link 60 from rotating counterclockwise under the return force exerted thereon by the master cylinder 14 through the push rod 78 and pin 74. Thus, the master cylinder returns to the release position wherein no hydraulic service brake pressure is applied to actuate the service brakes 20, 22, 24 and 26. However, the parking brakes 28 and 30 remain applied. The spring 164 in servo 144 acts to move piston 150 and link 160 so as to move the parking brake pedal arm 48p until pedal 46p once again engages pedal 46s and service brake pedal arm 48s is in engagement with pin 74 at 76 once again. At this point the pedal arms 48p and 48s, the link 60, the pin 74, the push rod 78 and the master cylinder 14 are returned to the base condition.

The vehicle is in a park-rest condition with the transmission control mechanism in park and the parking brake mechanism applied. No energy such as the energization of a vacuum servo or the solenoid 96 is required to maintain this park position.

The vehicle operator may at some later time desire to again use the vehicle. He may restart the engine while the transmission control mechanism remains in park, or he may shift the transmission control mechanism into neutral and then restart the engine. If he restarts the engine first, the solenoid 96 remains deenergized because, even though he closes the switch 44, the relay 180 cannot be energized because switch 182 is open as is the relay control switch 186. Therefore, the relay control switch 178 is open, effectively preventing energization of solenoid 96. The reset circuit of FIG. 4 requires the transmission control mechanism 184 to be shifted out of park and then back into park in order to permit solenoid 96 to be energized.

After starting the engine, the vehicle operator will shift the transmission out of park. This usually occurs because he desires to move the vehicle in the forward direction and he therefore places the transmission in a drive position, or he desires to move the vehicle in a reverse direction and therefore places the transmission control mechanism in the reverse position. Upon shifting the transmission out of park, valve 142 is positioned so that vacuum is applied to the servo 114. This releases the normally engaged clutch 100, releasing the gear 98 so that it may rotate in the clockwise direction. The tension force in cable 36 therefore moves the link 58 counterclockwise, with the gear sector 62 causing rotation of gear 98, to release the parking brakes. At this point, no vehicle brakes are applied and the vehicle may be driven. Therefore, shifting the transmission control mechanism out of park with the vehicle engine running functions as an automatic parking brake release. If the vehicle operator shifted the transmission control mechanism out of park before restarting the engine, the vacuum would be applied to servo 114 when the engine is restarted so that vacuum is provided by the vacuum source 42, valve 142 having been positioned for this purpose. The system has, therefore, been returned to the base condition illustrated in FIG. 1.

Should the service brake system become inoperative while the vehicle is moving and the vehicle operator wants to obtain braking action, he may manually close switch 190. This energizes solenoid 96 and conditions the parking brake actuating linkage for operation. The operator then presses down on pedal 46p, rotating parking brake pedal arm 48p clockwise. This drives link 58 clockwise, tensioning cable 36 and actuating the parking brakes 28 and 30. If there is vacuum in source 42, the clutch 100 is disengaged and the mechanical braking action is controlled much like service brakes in that the brakes 28 and 30 are applied only while the pedal arm 48 is depressed. If there is no vacuum in source 42, the brakes 28 and 30 remain applied just as in normal parking brake operation earlier described. The mechanism can be mechanically released by moving spring arm 110 manually to disengage clutch 100 if necessary, allowing the vehicle to be moved without damaging the parking brakes.

The embodiments of the invention in which an exclusive property or privilege is claimed are defined as follows:

1. A brake pedal arm service brake and parking brake arrangement for a motor vehicle comprising:
   a vehicle brake having a service brake operator and a parking brake operator;

a brake pedal arm assembly having first and second pedal arms selectively movable together from a first position to a second position to cause operation of said service brake operator, said first pedal arm being selectively movable to a third position and selectively movable from said third position toward said first position to cause operation of said parking brake operator;

each of said first and second pedal arms including pedal positioned for operative foot operation, and means including portions of said first and second pedal arms acting in overlapping relation so that both of said pedal arms are moved together between said first and second positions while permitting said first pedal arm to be moved between said first and third positions without corresponding movement of said second pedal arm, and means responsive to establishment of a first vehicle control condition to move said first pedal arm to said third position and to disestablishment of the first vehicle control condition to move said first pedal arm from said third position to said first position and to release said parking brake operator.

2. A pedal arm service brake and parking brake operating mechanism for a vehicle having a service brake and a parking brake, said mechanism comprising:

first and second brake pedal arms pivotally mounted on a common axis for brake actuating and release movements;

each of said first and second brake pedal arms including a pedal positioned for operative foot actuation by a vehicle driver, and means including portions of said first and second brake pedal arms acting in overlapping relation so that both of said brake pedal arms may be moved in the brake actuating direction with one actuation by the vehicle driver in one mode of operation and only one brake pedal arm may be moved in the brake actuating direction by the vehicle driver in another mode of operation;

a sector pivotally mounted with said first brake pedal arm and having a parking brake actuator operatively attached thereto, said sector being pivotally movable in a brake actuating direction in response to at least a component of brake actuating pivotal movement of said first brake pedal arm to activate said parking brake actuator and operate the vehicle parking brake;

a service brake actuator activated by at least a component of brake actuating pivotal movement of said second brake pedal arm to operate the vehicle service brake;

first means selectively permitting and preventing brake releasing pivotal movement of said sector, said first means including a selectively energizable servomotor;

second means under control of and operated by the vehicle driver, said second means controlling energization and deenergization of said servomotor to operatively hold and release the parking brake after the parking brake has been actuated by arcuate movement of said first brake pedal arm and said sector.

3. A pedal arm service brake and parking brake operating mechanism for a vehicle having a service brake and a parking brake, said mechanism comprising:

first and second brake pedal arms pivotally mounted for brake actuating and release movement about a common axis;

each of said first and second brake pedal arms including a pedal positioned for operative foot actuation by a vehicle driver, and means including portions of said first and second brake pedal arms acting in overlapping relation so that both of said brake pedal arms may be moved in the brake actuating direction with one actuation by the vehicle driver in one mode of operation and only one brake pedal arm may be moved in the brake pedal actuating direction by the vehicle driver in another mode of operation;

a toothed sector pivotally mounted with said first brake pedal arm and having a parking brake actuator operatively attached thereto, said toothed sector being pivotally movable in a brake actuating direction in response to at least a component of brake actuating pivotal movement of said first brake pedal arm to activate said parking brake actuator and operate the vehicle parking brake;

a service brake actuator activated by at least a component of brake actuating pivotal movement of said second brake pedal arm to operate the vehicle service brake;

a pawl pivotally engageable with said toothed sector and when so engaged ratcheting thereon during brake actuating pivotal movement of said toothed sector while preventing brake releasing pivotal movement of said toothed sector;

first means and second means respectively and selectively holding said pawl engaged with and disengaged from said toothed sector; and third means including mechanism acting on said toothed sector to operatively latch and unlatch said parking brake actuator to hold and release the parking brake, said third means being under control of the vehicle driver and controlling said first and second means to selectively latch and unlatch said toothed sector.

4. A dual pedal arm service brake and parking brake operating mechanism for a vehicle having a service brake and a parking brake, said mechanism comprising:

a single parking brake pedal arm and a service brake pedal arm pivotally mounted on a common axis for brake actuating and release movements, said pedal arms each having a pedal thereon positioned for foot operation, said parking brake pedal overlapping said service brake pedal so that foot operation of said service brake pedal is obtained by overlapping engagement of said parking brake pedal with foot force applied to said parking brake pedal in the brake actuating direction of movement;

a sector pivotally mounted with said brake pedal arm and having a parking brake actuator operatively attached thereto, said sector being pivotally movable in a brake actuating direction in response to at least a component of brake actuating pivotal movement of said parking brake pedal arm to activate said parking brake actuator and operate the vehicle parking brake;

a service brake actuator activated by at least a component of brake actuating pivotal movement of said service brake pedal arm to operate the vehicle service brake;

first means selectively permitting and preventing brake releasing pivotal movement of said first sector, said means including a selectively energizable servomotor; and second means under control of and operated by the vehicle operator, said second means controlling energization and deenergization of said servomotor to operatively hold and release the parking brake after the parking brake has been actuated by arcuate movement of said brake pedal arm and said sector.

5. A combined service brake and parking brake control mechanism for a vehicle having a service brake, a parking brake, and a transmission control shiftable into and out of park, said mechanism comprising:

a movable parking brake pedal arm mounted on an axis for arcuate movements including first and second arcuately spaced parking brake pedal arm positions;

a movable service brake pedal arm mounted on an axis for arcuate movements including first and second arcuately spaced service brake pedal arm positions;

a service brake pedal on said service brake pedal arm and a parking brake pedal on said parking brake pedal arm and overlapping said service brake pedal so that arcuate movement of said parking brake pedal arm to said second position thereof causes movement of said service brake pedal arm to said second position thereof;

first means responsive to movement of said service brake pedal arm from said first service brake pedal arm position toward said second service brake pedal arm position by movement of said parking brake pedal to actuate the service brake;

second means activated only in response to the shifting of the vehicle transmission control into park, said second means including one portion activated to condition the mechanism for parking brake operation by said parking brake pedal arm and another portion activated to control the mechanism for latching the mechanism in a parking brake actuated position; and third means activated in response to movement of said parking brake pedal arm from said first parking brake pedal arm position toward said second parking brake pedal arm position, only while the mechanism is conditioned for parking brake operation, to actuate the parking brake, said third means including a link mounted on said axis for arcuate movement and a parking brake operator attached thereto for actuating the parking brake by movement of said link in one arcuate direction consistent with arcuate brake actuating movement of said brake pedal arm, said second means another portion when actuated cooperating with said link to permit parking brake actuation by said link movement in the one arcuate direction and prevent parking brake release by latching said link against link movement in the opposite arcuate direction;

said second means being deactivated in response to the shifting of the transmission shift control out of park, releasing the latched link to permit its movement to release the parking brake.

* * * * *